United States Patent [19]

Conrad

[11] 4,214,488
[45] Jul. 29, 1980

[54] POSITIVE DRIVE SYSTEM

[75] Inventor: René A. Conrad, Woodside, Calif.

[73] Assignee: Dynaloc Corporation, San Mateo, Calif.

[21] Appl. No.: 845,929

[22] Filed: Oct. 27, 1977

[51] Int. Cl.² .................................................. F16G 1/28
[52] U.S. Cl. .................................... 474/148; 474/154
[58] Field of Search ............... 74/231 R, 243 B, 229, 74/231 C, 238, 257, 243 LB; 198/848; 59/2, DIG. 1

[56] References Cited

U.S. PATENT DOCUMENTS

| | | | |
|---|---|---|---|
| 422,955 | 3/1890 | Lorimer | 74/243 B |
| 488,640 | 12/1892 | Tuck | 74/243 B |
| 624,177 | 5/1899 | Church | 74/243 B |
| 1,327,925 | 1/1920 | Schneider | 74/243 B |
| 2,000,952 | 5/1935 | Hodson | 74/230 |
| 2,674,307 | 4/1954 | Calmy | 74/243 B |
| 2,874,583 | 2/1959 | Platt | 74/229 |
| 2,935,881 | 5/1960 | Cayton | 74/243 B |
| 3,187,596 | 6/1965 | Doerr | 74/243 R |
| 3,237,470 | 3/1966 | Birk | 74/243 R |
| 3,451,282 | 6/1969 | Appleton | 74/231 R |
| 3,517,565 | 6/1970 | Smith | 74/231 R |
| 3,748,917 | 7/1973 | Berg | 74/231 R |
| 3,985,037 | 10/1976 | Peyser | 74/243 B |

FOREIGN PATENT DOCUMENTS

| | | | |
|---|---|---|---|
| 1270028 | 4/1902 | France | 74/229 |
| 1201852 | 3/1958 | France | 74/229 |
| 16221 | of 1895 | United Kingdom | 74/243 B |
| 24361 | of 1899 | United Kingdom | 74/243 B |
| 6672 | of 1900 | United Kingdom | 74/243 B |

*Primary Examiner*—Samuel Scott
*Assistant Examiner*—Wesley S. Ratliff, Jr.
*Attorney, Agent, or Firm*—Claude A. S. Hamrick

[57] ABSTRACT

A positive drive system including a drive cable consisting of a flexible line means having a plurality of regularly spaced nodules rigidly attached along its length, and a positive drive sheave having a curved surface configuration receptive to the drive cable's nodules for providing a positive, nonslip rotary drive engagement between the drive cable and the sheave.

18 Claims, 38 Drawing Figures

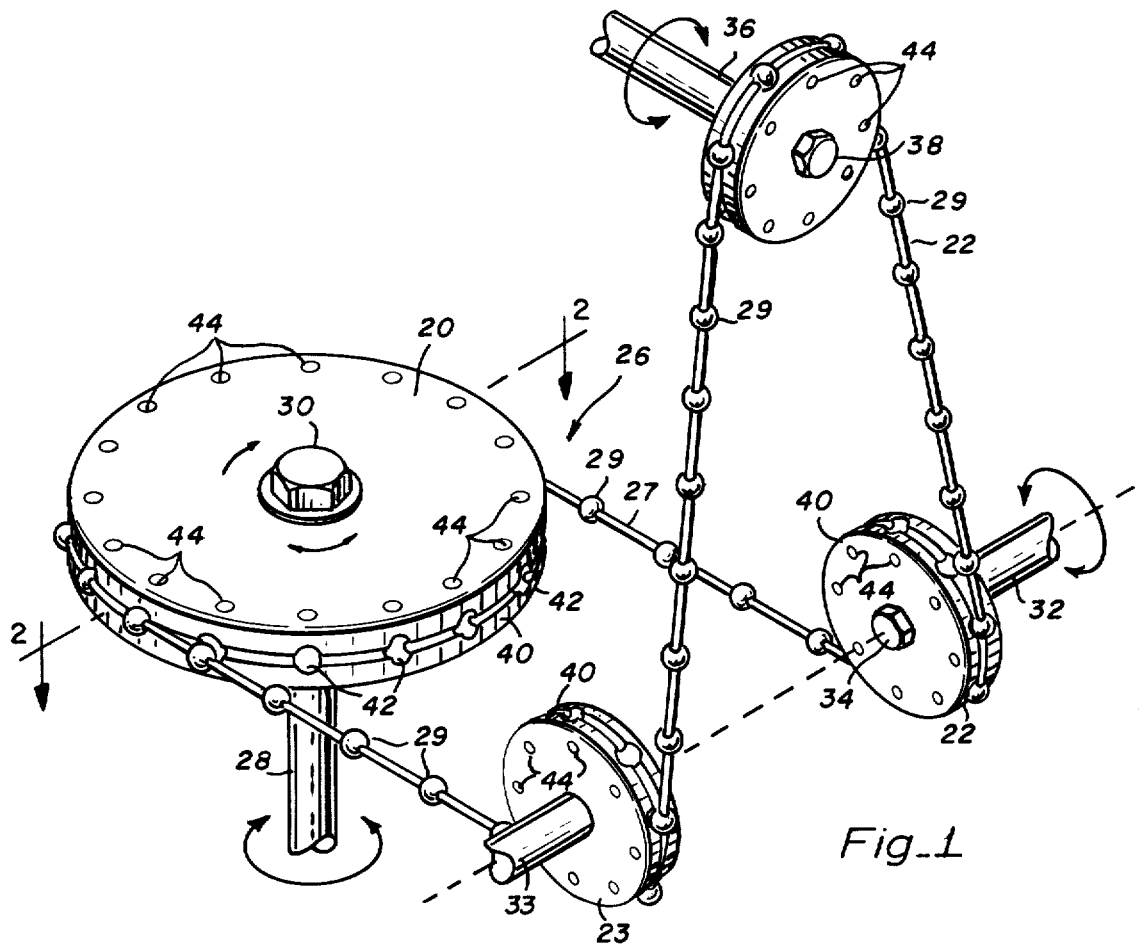
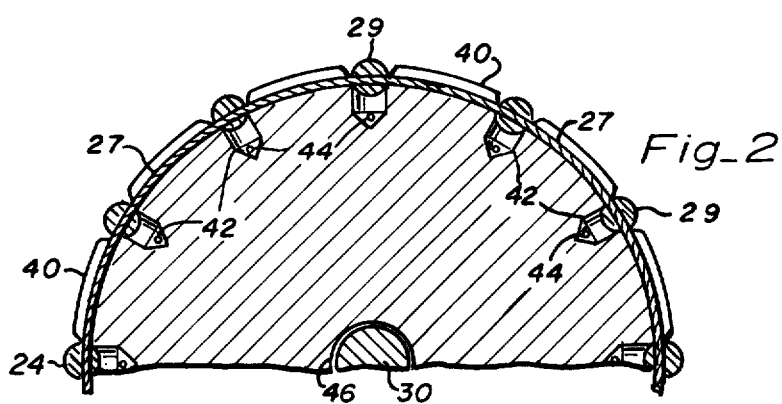
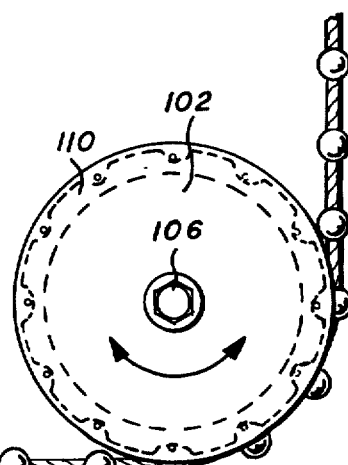
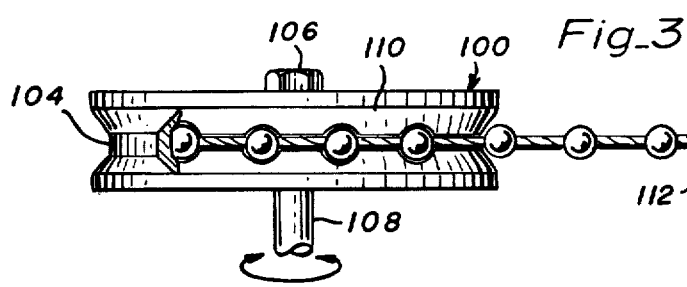
Fig_1
Fig_2
Fig_3

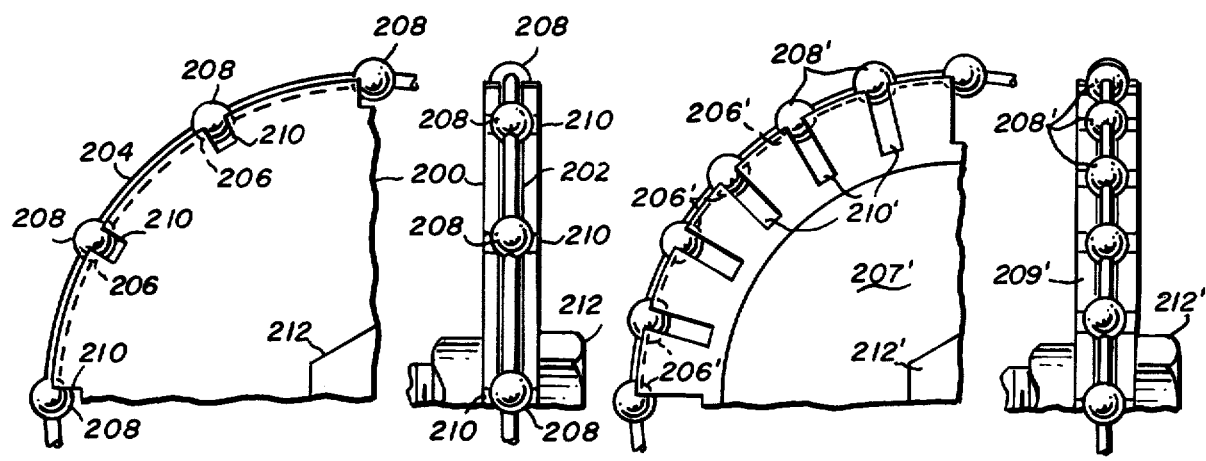
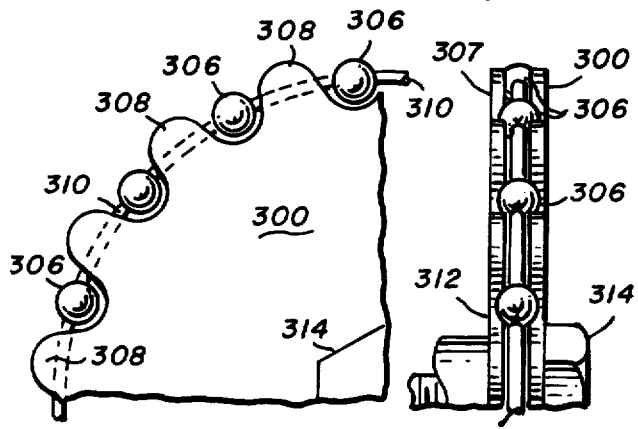
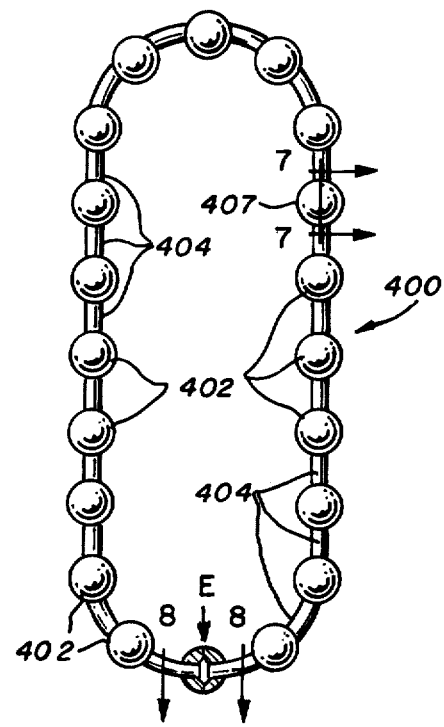
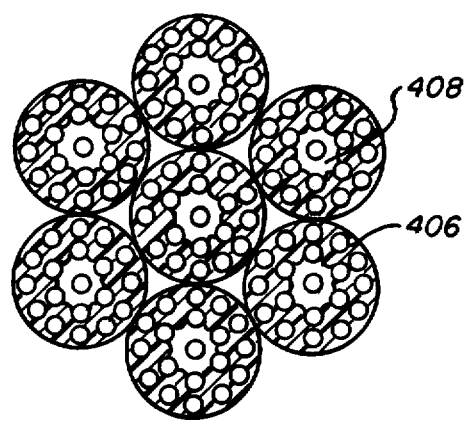

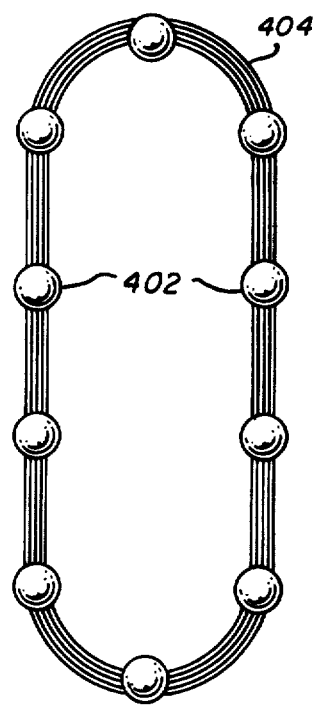
Fig_6c
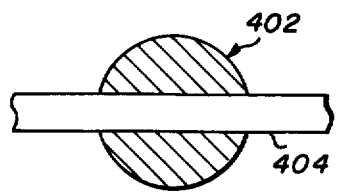
Fig_7a
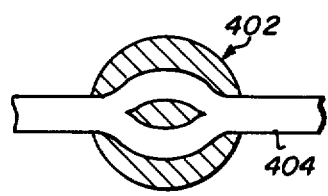
Fig_7b
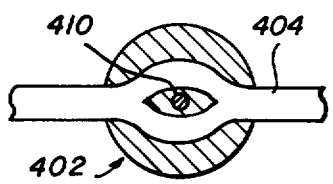
Fig_7c
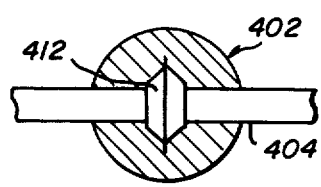
Fig_7d
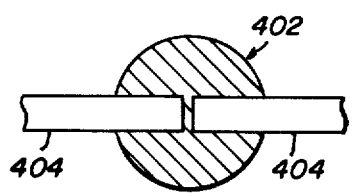
Fig_8a
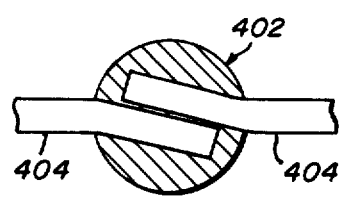
Fig_8b
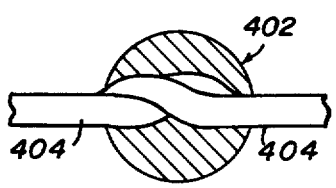
Fig_8c
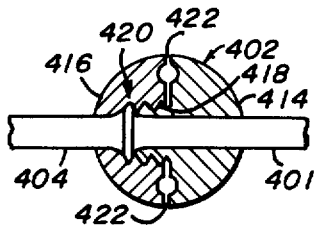
Fig_8d
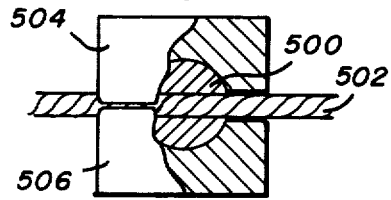
Fig_8e
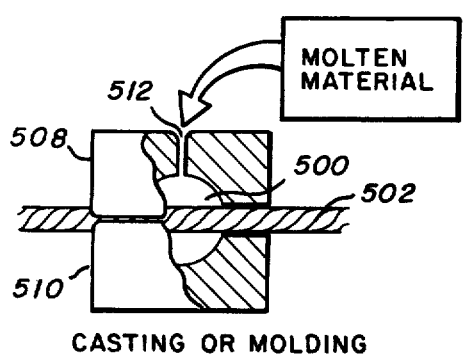
SWAGING
Fig_9a
CASTING OR MOLDING
Fig_9b
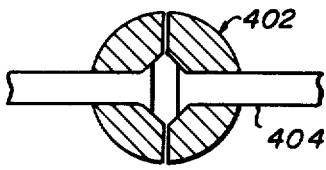
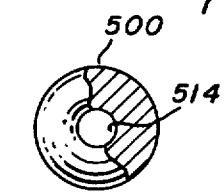
PREFORM AND ATTACH
Fig_9c
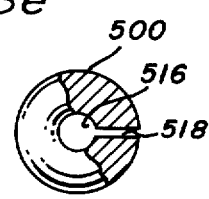
PREFORM AND ATTACH
Fig_9d

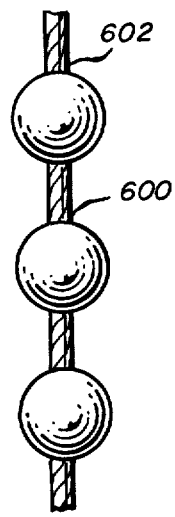
Fig_10
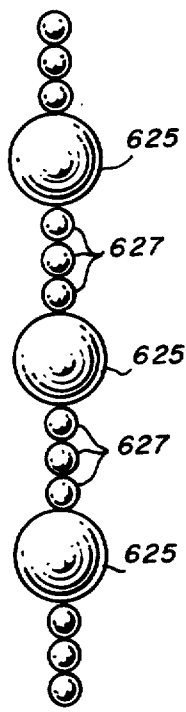
Fig_11
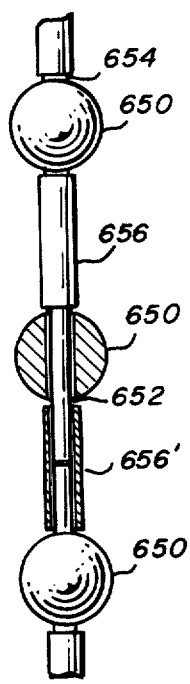
Fig_12
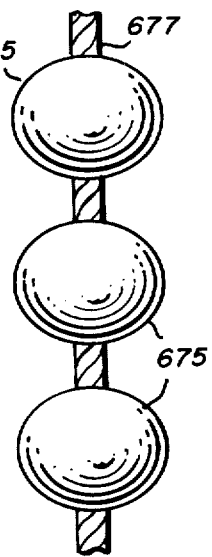
Fig_13a
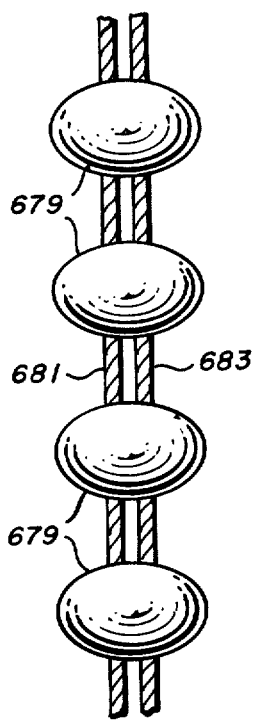
Fig_13b
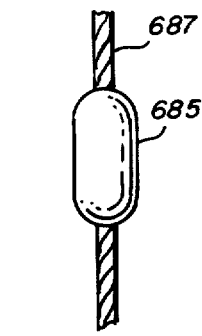
Fig_13c
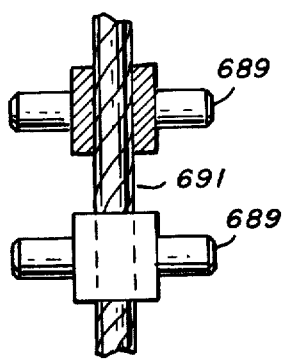
Fig_13d
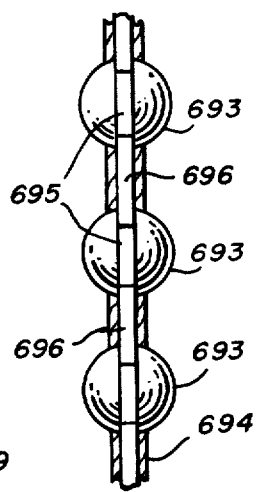
Fig_13e
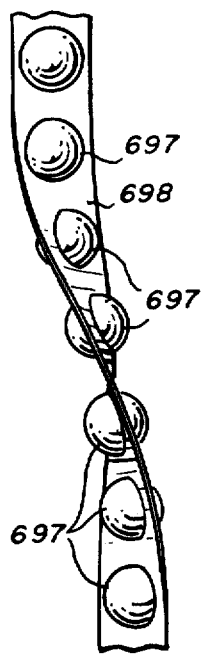
Fig_13f

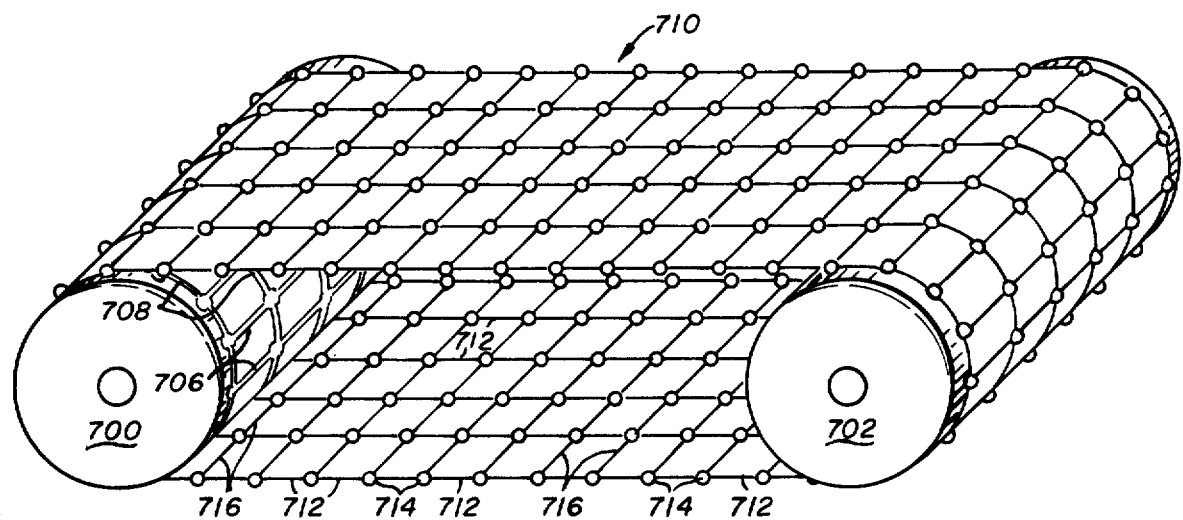
Fig_14a
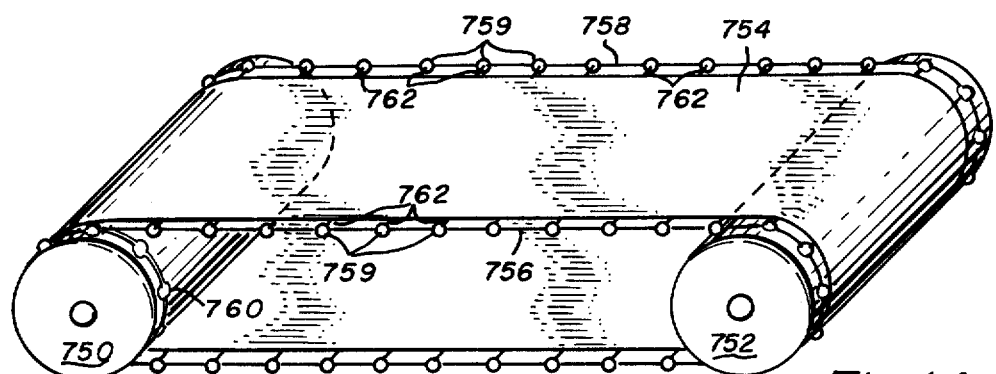
Fig_14c
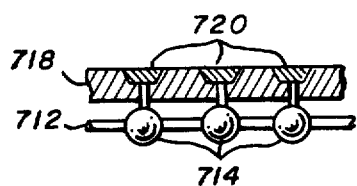
Fig_14b
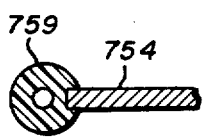
Fig_14d
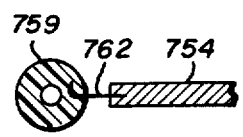
Fig_14e
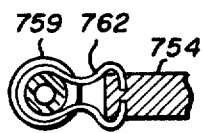
Fig_14f

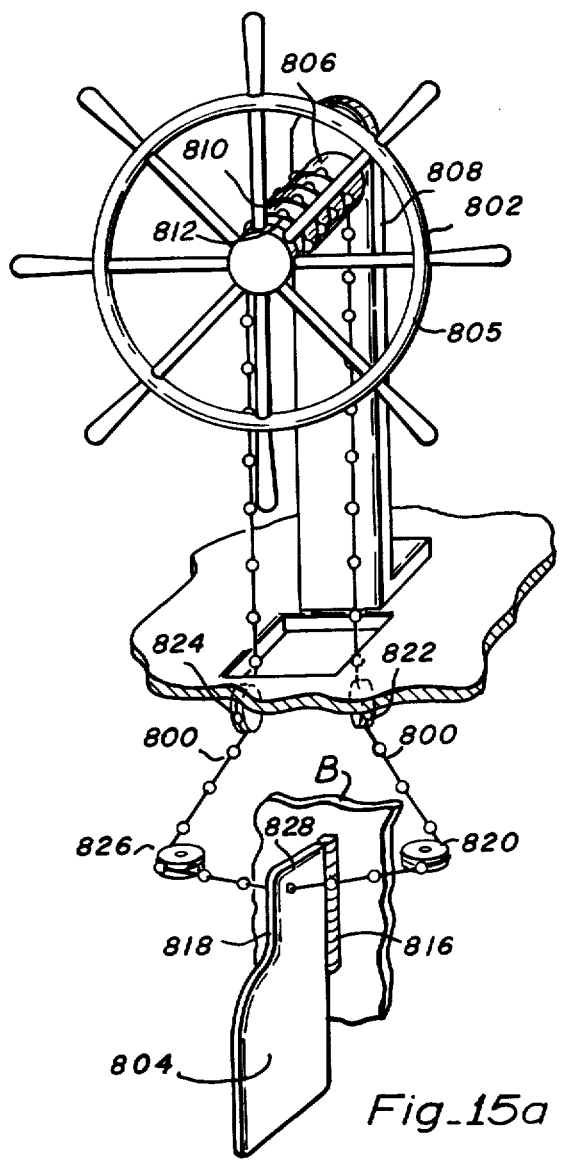
Fig_15a
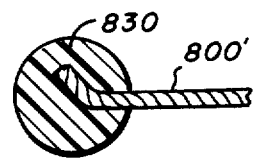
Fig_15b
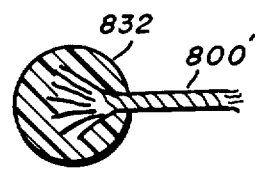
Fig_15c

POSITIVE DRIVE SYSTEM

BACKGROUND OF THE INVENTION

1. Field of the Invention

This invention relates generally to pulley drive systems and more particularly to drive systems including a plurality of nodules attached together to provide positive rotary drive engagement with a suitably constructed pulley, sheave or sprocket.

2. Description of the Prior Art

Drive systems are used where it is desirable to couple two or more rotary members together for common rotation. Types of drive systems found in the prior art include the V-belt and pulley drive system, the chain and sprocket drive system and the flat belt and sheave drive system.

Every drive system found in the prior art has its own particular strengths and weaknesses which makes it suitable for certain applications but not for others. For instance, drive chain and sprocket systems are very well suited for heavy duty, high torque drive applications but are not well suited for high speed usages because of the excessive wear produced in linkage joints at high RPM's. The V-belt drive system is well suited for high speed applications but not so well suited for heavy duty, high torque jobs due to possible belt slippage. A solution suggested by the prior art as to the problem of producing a drive system that both has high load drive capabilities and which may be run at high RMP's is the "silent chain" or "toothed belt" system. Unfortunately, the silent chain is subject to excessive and premature wear and is quite costly to manufacture.

Most drive systems found in the prior art are suitable only for applications where the rotary members to be driven have parallel axes of rotation. This is certainly true in the case of drive chains which have only a very limited ability to twist out of a single plane of rotation and to lesser extent with V-belts which also resist such twisting.

Drive systems such as those disclosed by C. H. Davids in U.S. Pat. No. 538,222 and by G. F. Bahr in U.S. Pat. No. 2,856,752 were developed to overcome some of the limitations found in other prior art drive systems. Both Davids and Bahr disclose bead chain drive systems including a chain consisting of a plurality of beads loosely connected by short links and sheaves having grooves and/or pockets formed about their curved periphery for engagement with the beads in the chain. The bead chain drive systems found in the prior art overcome many of the previously discussed inadequacies of prior art drive systems in that they are relatively inexpensive to manufacture and may drive rotary members whose planes of rotation are not coincident. However, bead chains found in the prior art are still subject to excessive wear at high RPM's and are not suitable for heavy duty drive applications.

Thus, the prior art does not disclose a single drive system which combines the advantages of inexpensiveness, high RPM durability, high load drive capabilities, and the ability to simultaneously drive rotary members lying in several planes of rotation.

SUMMARY OF THE INVENTION

It is an object of this invention to provide a positive drive system that is simple and inexpensive to manufacture and which is extremely durable and longlasting.

It is a further object of this invention to provide a positive drive system which may be used for high RPM drive applications.

Yet another object of this invention is to produce a positive drive system which is capable of driving high torque loads.

Another object of this invention is to produce a positive drive system for which the drive cable may drive sheaves having axes of rotation in virtually any plane relative to one another.

Yet a further object of this invention is to produce a drive cable which has no moving parts.

The above objects have been met with a positive drive system which includes, briefly, a drive cable consisting of a flexible line means having a plurality of nodules situated thereon in a regular spaced apart relationship and a positive drive sheave having a curved surface configuration receptive to the drive cable's nodules so that there is a positive, nonslip rotary drive engagement between the drive cable and the sheave.

An advantage of the present invention is that the drive cable has no moving parts to rattle or wear.

Another advantage of the present invention is that, because the drive cable is symmetrical, it may twist and bend around any number of corners and thus allow the sheaves that it is engaged with to have axes of rotation lying in any number of planes.

Another advantage of the present invention is that the drive cable may be used at a high RPM without excessive wear and may also be used to drive rotary members under high torque conditions.

These and other objects and advantages of the present invention will no doubt become apparent to those skilled in the art after having read the following description for the preferred embodiments of the positive drive system as illustrated in the several figures of the drawing.

IN THE DRAWINGS

FIG. 1 is a perspective view of a positive drive system in accordance with the present invention;

FIG. 2 is a cross-sectional view taken along line 2—2 of FIG. 1 which further illustrates a positive drive sheave shown in FIG. 1;

FIG. 3 illustrates a first alternate embodiment for a positive drive sheave in accordance with the present invention;

FIG. 4a is a partial plan view of a second alternate embodiment for a positive drive sheave in accordance with the present invention;

FIG. 4b is a partial side elevation view of a second alternate embodiment for a positive drive sheave in accordance with the present invention;

FIG. 4c is a partial plan view of a third alternate embodiment for a positive drive sheave in accordance with the present invention;

FIG. 4d is a partial side elevation of a third alternate embodiment for a positive drive sheave in accordance with the present invention;

FIG. 5a is a partial plan view of a fourth alternate embodiment for a positive drive sheave in accordance with the present invention;

FIG. 5b is a partial side elevation view of a fourth alternate embodiment for a positive drive sheave in accordance with the present invention;

FIG. 6a is a plan view of a preferred embodiment of a drive cable in accordance with the present invention;

FIG. 6b is a cross-sectional view of a preferred cable type for the construction of a drive cable in accordance with the present invention.

FIG. 6c is a plan view for an alternate construction of a closed loop drive cable in accordance with the present invention;

FIG. 7a-d show cross-sections taken along line 7—7 of FIG. 6 illustrating alternate means for anchoring a nodule to a central portion of a flexible line means.

FIGS. 8a-e show cross-sections taken along 8—8 of FIG. 6 illustrating alternate means for attaching the two ends of a flexible line means together using a nodule;

FIGS. 9a-d illustrate four methods for forming a nodule onto the flexible line means of a drive cable;

FIG. 10 is a partial plan view of a first alternate embodiment for a drive cable as shown in FIG. 1;

FIG. 11 is a partial plan view of a second alternate embodiment for a drive cable as shown in FIG. 1;

FIG. 12 is a partial plan view of a third alternate embodiment for a drive cable as shown in FIG. 1;

FIG. 13 are partial plan views of other alternate embodiments for a drive cable as illustrated in FIG. 1;

FIG. 14a is a perspective view illustrating a preferred embodiment of the positive drive concept as applied to a conveyor belt system;

FIG. 14b is a partial cross-sectional view showing construction details of a first alternate embodiment of the positive drive conveyor shown n FIG. 14a;

FIG. 14c is a perspective view of a second alternate embodiment of a positive drive conveyor system in accordance with the present invention;

FIGS. 14d-f are cross-sectional views showing three altnerate attachment means for connecting the nodules of a drive cable to the conveyor belt shown in FIG. 14c;

FIG. 15a is a perspective view of a ship's steering system illustrating a control cable application for a drive cable in accordance with the present invention;

FIG. 15b-c are cross-sectional views illustrating two embodiments for an end nodule of the drive cable shown in FIG. 15a.

DESCRIPTION OF THE PREFERRED EMBODIMENT

Referring to FIG. 1, a perspective view of an exemplary cable drive system is shown including a first, second, third and fourth cable drive sheaves 20, 22, 23 and 24, respectively, and a drive cable 26 comprising an endless or closed loop of cable 27 having a plurality of round nodules 29 situated thereon in a regular, spaced apart pattern. A nodule, for this discussion, is a mass of material formed into any regular external configuration and attached to the drive cable.

In general size and shape, sheaves 20-24 are not dissimilar to V-belt type pulleys such as those commonly used to drive the generator and water pump of an automotive engine. In fact, the terms sheaves, pulleys and sprockets will be used almost interchangeably in this specification to refer to rotary members in engagement with a drive cable. Sheave 20 is attached to a shaft 28 by means of a compression bolt 30 which extends through an axial bore formed in the sheave. The compression bolt is tightened on shaft 28 until frictional and compressional forces rigidly lock the sheave and shaft together insuring that a rotation of the shaft will produce a rotation of the sheave and visa-versa. Similarly, sheave 22 is attached to a shaft 32 by a compression bolt 34, sheave 23 is attached to a shaft 33 by a compression bolt not seen in this figure and sheave 24 is attached to a shaft 36 by a compression bolt 38.

About the curved surface of each of the sheaves lies a circumferential groove 40 which is approximately as deep and wide as the diameter of cable 27. In this preferred embodiment the groove is actually 1/64 of an inch larger than the cable to prevent possible binding problems. A plurality of depressions or pockets 42 are equally spaced about the perimeter of each of the sheaves and are centered along groove 40.

Cable 26 is trained around each of the sheaves in an endless loop such that cable 27 resides in slots 40 and a plurality of nodules 29 individually engage one of pockets 42. Obviously, the pitch of the drive cable, i.e., the distance between nodules 29, must be similar to the pitch of the pulleys, i.e., the distance between pockets 42. The engagement of nodules and pockets produces a positive, nonslip drive between the four sheaves so that as one sheave is caused to rotate, the drive cable rotates the other sheaves in turn. Note that in the cable drive system of the present invention the axes of rotation of the sheaves need not be parallel, in contrast to the V-belt or chain drive systems found in the prior art. This is clearly shown in FIG. 1 by noting that shafts 28, 33 and 36 are at substantially right angles to one another.

An important concept to understand is that a drive cable in accordance with the present invention may drive pulleys that have differing axes of rotation (i.e., lie in different planes of rotation) due to the 360° symmetricality of the drive cable. By the use of suitably disposed sheaves the cable can be trained around corners, over obstacles and through otherwise almost inaccessible apertures to drive or connect rotating or reciprocating members.

Each of the sheaves are provided with a plurality of air vents or bores 44 formed through the sheave pockets so that air compression will not occur as nodules 29 engage the pockets, and also reduce noise to an acceptable level. Vents 44 further serve to prevent any grease or other foreign matter from collecting within, and eventually filling, the pockets by providing an escape route for such waste. The vents, in the present embodiment, extend axially through the sheaves so that the pockets are redundantly vented.

Referring now to FIG. 2, which a cross-sectional view of sheave 24 taken along lines 2—2 of FIG. 1, it is possible to explain in greater detail the construction of a sheave of the preferred embodiment. Pockets 42 can be seen to extend radially inwardly as cylindrical bores tapering to generally conical terminations and vent holes 44 can be seen to connect the pockets with the ambient environment to prevent air compression.

In this preferred embodiment contact between nodules 29 and the pockets is confined to the lip of the pocket and to a circular portion of the nodule's exterior. Because the nodules are prevented from slapping the bottom and/or sides of the pockets much undue noise and wear is prevented.

Groove 40 is suitably deep and wide to fully accept cable 27, which helps prevent the cable from slipping or jumping off the sheave. Also seen is a cross-section of part of a compression bolt or shaft extending through bore 46 in the sheave.

This particular sheave type is well suited for medium duty, high speed applications where low noise and long wear are critical factors. The sheave may be made from may suitable materials such as steel, cast iron, aluminum, plastic or rubber.

An alternate construction for a positive drive sheave, as illustrated in FIG. 3, includes a pair of V-belt pulleys 100 and 102 each having an inwardly tapering, trapezoidal groove 104 circumferentially formed about its curved perimeters. The pulleys are attached by compression bolts 106 to shafts 108. An insert 110 is disposed within groove 104 in each of the pulleys to provide a curved surface suitable for engagement with a drive cable 112. In fact, after insert 110 is added to the V-belt pulley, the pulley closely resembles the sheave previously discussed. The advantage of the pulley of this embodiment is that V-belt pulleys in an existing system, such as on an automobile, may be modified for use with the more efficient cable drive system.

Insert 110 may be manufactured and attached to the V-belt pulleys in many ways. One preferred method of manufacture is to cast a flexible material such as hard rubber or urethane into semicircular sections and then to assemble them within the V-belt groove. The inserts may then be retained in the groove by any number of state-of-the-art adhesives, which usually create a bond that is at least as strong as the materials being bonded.

Another method for adding an insert is to injection mold or die-cast a single piece insert 110 directly into the V-belt pulley groove. This method produces an insert with a far superior strength due its one piece construction. Before casting or injection molding an insert, it is preferred that V-belt groove 104 be provided with a number of small holes or slots so that the injected material comprising insert 110 will form fingers or tabs of material which firmly grip the V-belt slot to prevent the inserted material from rotating therein.

Yet another alternate method for producing a modified V-belt pulley is to insert, mold or cast a blank insert into the groove and then machine a groove and a plurality of pockets on its curved surface so that it is suitable to receive the flexible line means and nodules, respectively, of drive cable 112. Such machining can be quickly and easily done on a standard industrial lathe by rotating the work piece (the V-belt pulley and insert blank) against a cutting tool to produce the circumferential groove and then circularly indexing the work piece and forming the pockets with a suitable boring tool.

The modified V-belt pulley of the present invention is suitable for use in a relatively high speed and heavy duty drive system. The nodules in this embodiment contact the entire inner surface of the pockets to produce a strong engagement as compared with the previous embodiment which had only partial nodule/pocket contact. Again each pocket is provided with a vent hole which further doubles as an exit channel for foreign matter which would otherwise become compacted in the pockets.

If insert 110 in this V-belt embodiment were constructed of a hard material the system would operate fairly noisily due to the slapping of the ball against the bottom of the pocket at high speed. However, by using flexible, resilient materials such as rubber or soft plastic for the nodules and/or for the pulley inserts this problem is overcome.

Referring now to FIGS. 4a-d a second and third alternate embodiment for positive drive system sheaves are shown in quarter view. The second alternate embodiment illustrated in FIGS. 4a and 4b, is typically made of a metal alloy such as steel which is manufactured by either machining a blank or by cast molding it in a more finished form. Pulley 200 is provided with a circumferential groove 202 to accept a cable 204, which in this present embodiment is not deep enough to fully engulf the cable. Pockets 206 are provided for engagement with nodules 208. The nodules do not quite contact the bottom of the pockets. Side slots 210 are formed to vent pockets 206 and further serve as cleaning ports through which nodules 208 may expel dirt or grime. This embodiment is suitable for medium high speed, medium high load drive system applications due to relatively great pocket/nodule contact. In this embodiment the sheave is also attached to a shaft by means of a compression bolt 212.

The third alternate embodiment for a positive drive sheave as shown in quarter view in FIGS. 4c and 4d is, in theory, quite similar to the embodiment just discussed. It may be seen, however, that this third embodiment has a greater number of pockets 206 formed per unit length around its perimeter and that the side slots 210' of the pockets are much deeper. Furthermore, the sheave is made in two parts, the first being an annular core 207' which is typically made from a metal alloy and the second part being an annular ring 209' which is made from a soft material such as rubber or plastic. Alternatively, the entire sheave may be made from a soft material. The pockets are closer together in this embodiment and the nodule contact virtually 100% of the pocket so that the pressure exerted by the nodules on the pockets of the soft material is more evenly distributed. The soft ring also allows for production inaccuracies of drive cable pitch by slightly deforming to accept the nodules.

Previously discussed embodiments may be unsafe should a sheave bearing freeze and the drive cable snap, possibly injuring a nearby person. In this third alternate embodiment, if a bearing should freeze, the soft material of annular ring 209' would yield in order to save the cable.

A fourth alternate embodiment for a positive drive sheave is shown in quarter view in FIGS. 5a and 5b. In this embodiment, a first sprocket wheel 300 and a second sprocket wheel 302 are aligned in facing proximity. A washer 304 is placed between the two sprocket wheels to maintain sprocket wheel separation. Nodules 306 of a drive cable reside in a plurality of valleys 310 defined between a plurality of teeth 308. The sheave is attached to a shaft 312 by a bolt 314 in a manner similar to the previously described embodiments.

A drive cable in accordance with the present invention is usually formed into an endless loop, as is illustrated by a cable 400 in FIG. 6a. Nodules 402 are formed about the loop to provide the engagement means between the cable and the sheave necessary to transfer the motion from one to the other. The actual construction of the nodules and their methods of attachment will be discussed with reference to the following figures.

In FIG. 6c cable 404 is woven as a continuous series of wire strands through nodules 402 so that, in effect, the cable 404 has no discrete beginning or end. This is a preferable method for many high load, heavy torque applications because the cable lacks weak spots where breakage may occur.

Due to the high cost of weaving a continuous looped cable it is, however, more cost effective to form a pre-manufactured cable into a loop by attaching its two ends together within one of the nodules. Referring again to FIG. 6a, such an attaching nodule is labeled "E".

The strength of the engagement between the drive cable and a sheave is directly dependant upon the spacing of nodule 402 the size of the nodules and the amount of nodule/pocket engagement, since all of these factors increase the area of contact between the drive cable and sheave. The shape of the nodules also effects the strength of the grip between the drive cable and pulley. Many nodule shapes are possible and several will be discussed in greater detail with reference to later figures.

Flexible line means 404 may itself be made of virtually any suitably flexible substance having sufficiently high tensile strength, since it is the line means that bears the entire drive force load. Some of the substances presently recognized as adequate for the job include multistrand steel or other alloy cables, nylon cables, cables comprising various plastic polymers, glass and carbon fiber cables, metal filled plastic cables, plastic filled metal cables, and monofilament plastic lines.

A preferred cable for use with the present positive drive system is 7×19 aircraft, preformed, galvanized and lubricated cable, a cross-section of which is illustrated in FIG. 6b. As can be seen in the figure, 7×19 cable has seven woven strands wherein one of the strands forms a center for the cable and the other six are wound helically about it. Each strand, in turn, includes eighteen wires helically wound about a nineteenth wire. A plastic resin 406 partially penetrates the bundle of wires forming a strand and thereby seals the central wires of the strand from the ambient environment. A lubricant 408 injected into the central region of each strand is sealed therein by the plastic coating. Thus, this type of cable has a self-lubricated core which results in much reduced strand wear and promotes the long life of the cable.

Another type of cable which may be used is 18×7 non-rotating wire rope which inhibits the rotation of the drive cable.

The flexibility of the cable is an important design factor in the present invention, particularly if the drive cable makes many twists or turns. Flexibility is realized in metal cables by using a large number of small diameter wires, by preforming the drive cable loop into the desired final configuration and by using special strand winding techniques, such as the lang lay, which are well known to those skilled in the art.

Cable strength for high torque drive applications may be insured by employing cables having high carbon, cold drawn cores. If it is imperative that the nodules wear evenly, a right or left hand cable strand lay may be used to cause the cable to precess as it is driven, insuring even wear on all sides of the nodules.

Of course, there are a large number of cable types and other flexible line means which are eminently suitable for various applications of the positive drive system of the present invention. It is therefore intended that this invention not be limited to any particular type but to include any and all suitable flexible line or cable means.

FIGS. 7a-d are cross-sectional views taken along line 7—7 of FIG. 6 and illustrate four methods of anchoring or attaching nodules 402 to a cable 404. In FIG. 7a, a nodule 402 is simply formed about a cable and attached thereto by adhesive bonding or by swaging. In FIG. 7b a cable 404 is first deformed either by strand separation or by "birdcaging" (enlargement of a cable by twisting it counter to its lay) to cause a regional deformation of the cable. A nodule is then swaged, cast or otherwise formed about the deformed region of the cable. In FIG. 7c a cable is again deformed, but this time a pin 410 is inserted through the deformed cable before a nodule 404 is formed about the deformation. In FIG. 7d an anchor 412 is first attached to a cable and then nodule 402 is formed about the anchor.

The nodule attachment method shown in 7a is best suited for use with multistrand steel cables about which a metal nodule is swaged into place. The swaged metal of the nodule actually enters the interstices of the cable and firmly bond to it. This method is very suitable for high speed, low drive torque applications where there is thus not a great deal of forced exerted on the nodules.

The deformation of cable 404 as seen in 7b helps nodule 402 maintain a strong grip on the cable, and thus makes it more suitable for high drive torque applications. By inserting a pin through the deformation of the cable, as in 7c, the nodule is even more firmly held in position on the cable.

The attachment or anchoring method shown in 7d is suitable for use in extremely high drive torque applications, or for applications where nodule 402 and cable 404 are of materials dissimilar enough so as not to bond together by swaging or adhesive techniques. For example, if nodule 402 is made of rubber or neoprene, it will not bond to a steel multistrand cable. Therefore, a steel anchor 412 would first be attached to the steel multistrand cable and then rubber nodule 402 would be formed therearound.

FIGS. 8a-e are sectional views taken along line 8—8 of FIG. 6 and illustrate several alternate methods for attaching the ends of a cable 404 together within an end nodule "E". In FIG. 8a the simplest method for attaching the cable ends together is shown, where the cables are held in juxtaposition and the nodule 402 is swaged about them to firmly bind the cable ends together. This is a relatively weak method of attachment and thus is not preferred for high torque applications.

For higher drive torque applications an end nodule arrangement as shown in FIG. 8b is preferable. In this embodiment the cable ends first approach and then flare away from each other, thereby increasing the total amount of cable end within nodule 402.

The simplest method for producing an end nodule as shown in FIG. 8b is to drill two parallel bores just on either side of the center of the nodule. The cable ends are inserted and retained therein by swaging or potting. The cables on each side of the end nodules are then placed in clamps and pulled so that the cable ends are substantially parallel to one another. Tests on this type of attachment nodule configuration indicate that the tensile strength of the bonding nodule can exceed the tensile strength of cable itself.

In FIG. 8c the ends of cable 404 are twisted together before a nodule 402 is formed around it. A method for accomplishing this includes slipping a drilled nodule onto a cable end, twisting the cable ends together and then sliding the nodule on top of the twist and swaging it thereon. Again, the primary advantage of this embodiment is the increased strength achieved in the cable end juncture.

FIG. 8d illustrates a specialized nodule for connecting two ends of a cable or other flexible line means together. In this embodiment two substantially hemispherical half-nodules 414 and 416 are fashioned with central bores and each is slipped onto the end of cable 404 in facing alignment. Hemispherical portion 414 is provided with a male threaded projection 418 and hemispherical portion 416 is provided with a female threaded recess 420. The ends of cable 404 are inserted through axial bores up to the face of each of their respective hemisphere and affixed thereat by butt welding, potting, or any other method. Finally, hemispherical portions 414 and 416 are then screwed together in order to form a completed nodule 402. A groove 422 is also provided between the hemispherical portions so that an epoxy or other adhesive substance may fill the groove to bond the hemispherical halves of the nodule together. However, in most cases the halves would not be bonded together so that the drive cable could be disassembled to facilitate installation and removal.

FIG. 8e illustrates another method for attaching cable ends which involves first forming hemispherical half nodules with a central bore, sliding the hemispheres, one each, onto a cable end, butt-welding the hemispheres together to form a single nodule, removing the flash produced, and finally swaging the ball together for additional strength. This method produces an extremely strong cable end juncture.

FIGS. 9a-d illustrate several of the many methods suitable for attaching nodules to a cable. FIG. 9a illustrates a pair of swage dies 504 and 506 which when placed together define an internal cavity the size and shape of a nodule. The dies further define two channels communicating between the cavity and the exterior of the dies for the disposition of a cable or other line means 502. In operation, dies 504 and 506 are separated, a cable 502 is placed in the cable channel and a metal, commonly in the form of powder or metal fillings, is inserted or injected into the cavity. When pressure is exerted, as illustrated by the arrows in FIG. 9a, the metal within the cavity is cold pressed or swaged into the proper nodule shape. The swaging produces a unitary nodule 500 which adheres to cable 502 by flowing into the interstices between the cable's strands.

The metal may obviously be introduced into the swage molds by many means, and the present invention is not restricted to the injection of powdered metal or metal fillings.

FIG. 9d illustrates an alternate method for nodule attachment which involves using a mold comprising two halves 508 and 510 which define a cavity therebetween in the shape of a finished nodule. As illustrated by the arrow in the figure, a molten material is poured down an access hole 512 and fills the cavity to produce a nodule 500 around a cable 502.

Yet another method for attaching nodules to a flexible line means involves preforming the nodules and then fastening them to the cable as a separate step. In FIG. 9c a spherically shaped nodule 500 is produced with an axial bore 514 through which strands of a cable are then threaded. The nodule is then fastened to the cable either by swaging, welding, soldering, an adhesive or by another suitable method.

In FIG. 9d a spherically shaped nodule 500 is formed including an axial bore 516 and a slot 518. A cable is then slid through slot 518 until it is disposed within axial bore 516 and is retained therein by any one of the methods described above, such as swaging or adhesive binding. Of course, there are many other methods for creating and attaching a nodule to a cable beyond the few illustrative methods described here, and therefore this invention should not be limited to any of the specific methods described.

FIG. 10 illustrates an alternate embodiment for a drive cable in accordance with the present invention wherein a metal cable 600 is covered with a plastic sheath 602 to protect both the cable and the sheave against excessive and/or premature wear. Furthermore, the plastic coating helps to quiet the cable drive system by reducing metal-to-metal contact. Of course, the sheave and/or the nodules can also be coated with a plastic material if it were so desired. The plastic coated cable of this present embodiment is well suited for use with the rubber or high temperature plastic nodules previously discussed and would also be well suited for use with the hard rubber or urethane inserts of the V-belt replacement sheave illustrated in FIG. 3.

Another method for reducing cable wear and operational noise involves impregnating, under pressure or by head treatment, the cable with a waxy or petroleum lubricant.

FIG. 11 illustrates a drive cable having two differently sized nodules attached in a regular, repeating pattern along the length of a cable. Large nodules 625 are commonly constructed from a strong, long wearing material such as steel and small balls 627 are commonly made of a lighter weight but also less expensive material such as plastic or rubber. With such a heterogenous mixture of large and small nodules, a greatly increased engagement is achieved between the cable and sheave without a correspondingly great increase in cost. Furthermore, the small plastic nodules prevent cable wear and reduce noise in a manner similar to the plastic coated cable embodiment previously discussed. A drive cable with large and small nodules may be used with a custom made sheave having both large and small pockets or it may be used with a more standard sheave which provides pockets only for the large nodules, causing the small nodules 627 to reside in the sheave's circumferential groove.

FIG. 12 illustrates another embodiment of a drive cable in accordance with the present invention. In this embodiment nodules 650 are provided with a bore 652 through which a cable 654 is passed. The bores are of sufficient diameter to allow the nodules to freely slide along the cable until they abut upon one of spacers 656 which are fused onto the cable. The spacers generally comprise a short hollow tube which is first slipped onto cable 652 and then fused thereon by welding, swaging, soldering or any other suitable method.

Spacer 656', shown in a cut-away view, is shown to be fused about the cable ends, thereby attaching them together.

The drive cable of FIG. 12 is very similar operationally to the previously described cables but has some unique advantages and disadvantages. A positive advantage of the present embodiment is that a nodule may slide a limited amount along cable 652 so that the machining of the pockets in the sheave under engagement need not be of as high a tolerance. A drawback of the present embodiment is that it has moving parts which introduce a source of frictional wear not present in embodiments with rigidly attached modules. Functionally, the nodule and spacer drive cable is identical to attached nodule drive cables in that they both transfer the force exerted on a nodule to a continuous flexible line or cable means.

In FIG. 13, six alternate embodiments for a drive cable are shown in order to illustrate the versatility of the cable drive system in adapting to specific design specifications. FIGS. 13a and 13b illustrate drive cable embodiments suitable for heavy duty drive applications. FIG. 13a illustrates a plurality of nodules 675 manufactured in the form of elipsoids with a 30° eccentricity.

This elipsoidal nodule configuration has greater surface area contact with the pockets of a sheave than a spherical nodule of the same mass and thus more firmly engages that sheave.

The embodiment illustrated in 13b has ellipsoidal nodules 679, having an eccentricity of 45°, which are formed symmetrically about two cables 681 and 683. This produces a drive cable with a greater surface of nodule/pocket contact than a spherical nodule of the same mass and which has enhanced tensile strength properties due to extra cable.

In FIG. 13c a roller bearing 685 is formed about a flexible line means 687. The roller bearing has the advantage of decreasing cable/sheave frictional forces by rolling when engaging a sheave pocket.

FIG. 13d shows a nodule 689 which comprises a pair of round pins attached 180° apart on a cylindrical tube which is affixed to a cable 691. Each of the pins may engage a separate sprocket wheel and thus may drive two sprocket wheels simultaneously. Alternatively, this nodule configuration is well suited to be used with the double sprocket sheave described previously.

In FIG. 13e grooved nodules 693 are shown to be attached to a pair of cables 694. This arrangement is ideally suited for use with a single drive sprocket and is therefore a direct replacement for existing drive or timing chains. A slot 695 engages the sprocket's teeth and apertures 696 allow for tooth penetration of drive cable. This drive cable represents a vast improvement over existing drive or timing chains because it has no moving parts and thus is less subject to wear. Futhermore, a drive cable in accordance with the present invention needs no lubrication as opposed to the frequent lubrication required for drive or timing chains.

FIG. 13f is a perspective view of a drive "cable" including a plurality of nodules 697 attached to a metal band 698 or to a ribbon of teflon coated fiberglass of high strength or to other high strength ribbon materials of woven metal and/or plastics. A preferred method for producing this embodiment is to prepunch holes in the ribbon and to cast nodules in place. Another method of attachment is to manufacture each nodule 697 as two separate hemispherical sections, prepunch holes in the ribbon, and then rivet the sections into place.

A preferred material for the ribbon is a spring steel, combining the characteristics of great strength and flexibility. This embodiment is suitable for extremely high drive torque applications and is also well suited for applications requiring constant cycling, such as massive refrigeration systems.

Referring now to FIGS. 14a-f a new application for the cable drive system is shown where drive cables are used for conveyor belt systems. In FIG. 14a an endless conveyor belt system is illustrated having a first and second cylindrical end roller 700 and 702, respectively. Each of the rollers has a plurality of regularly spaced recesses or pockets 704 formed around their outer curved surfaces. Connecting the pockets are longitudinal grooves 706 and circumferential grooves 708.

Positive drive conveyor belt 710 includes a plurality of drive cables 712 formed into parallel endless loops and having nodules 714 rigidly attached along their length. Drive cables 712 are interconnected through their nodules by a plurality of cables 716. In other words, drive cables are formed into a conveyor belt by connecting the drive (warp) cables with interconnecting (woof) cables to produce a continuous grid-like belt on which objects may be carried. When trained over the rollers, nodules 714 engage pockets 706 and cables 712 and 716 engage grooves 706 and 708, respectively.

The drive belt described above may be used to transport objects that are large in relation to the spaces between adjacent cables. However, for some applications a conveyor surface comprised of a strong cloth-like material such as canvas may be attached to the positive drive conveyor belt to eliminate the possibility of small objects falling through the spaces.

Referring now to FIG. 14b, a method for attaching a conveyor surface to the positive drive conveyor is shown. Here a plurality of flat headed rivets 720 penetrate the conveyor surface material to engage a plurality of nodules 714 of the cable drive conveyor. Other methods of attachment between the two such as adhesive binding, etc., are contemplated and are alternate embodiments for the conveyor belt system illustrated in 14b.

In FIG. 14c another positive drive conveyor system in accordance with the present invention is shown. Here, trained about a central portion of cylindrical rollers 750 and 752, is an endless conveyor belt 754. Two drive cables 756 and 758 are also trained around the rollers proximate to the edges of conveyor belt 754. Each of the rollers has pockets 760 formed in their curved surfaces to engage the nodules of drive cables 756 and 758. Connecting the drive cables to the conveyor belt are a plurality of connectors 762. Thus, the rollers, drive cables and conveyor are linked for positive, nonslip mutual rotation.

Methods for attaching the nodules of drive cable 756 and 758 to the conveyor belt are numerous, and a very few of them are illustrated in cross-section in FIGS. 14d, e and f. In FIG. 14d, instead of using connectors to attach the nodules to the conveyor belt, the belt is directly swaged onto the nodules. In FIG. 14e a hook 762' is swaged onto a nodule 759 at a first end and embedded in or hooked onto conveyor belt 754 at a second end. In FIG. 14f a nodule 759 is grooved circumferentially to accept a "hogring" type hook 762' which attaches it to conveyor belt 754.

Applying the positive drive system concept to conveyor belts as shown and described creates a conveyance means which may carry extremely heavy loads without belt slippage, which may be used to accurately index objects for automatic processing, and which further may quickly reverse direction without belt slippage.

Heretobefore the drive cables under discussion have always been assumed to be constructed as a continuous or endless loop. However, certain applications for the cable drive system of the present invention call for a length of drive cable not necessarily formed into an endless loop. For example, in FIG. 15a, a drive control or cable 800 is used as a transducer to convert the rotary motions of a ship's steering wheel 802 into a reciprocating motion at a rudder 804. A steering wheel 805 is rigidly affixed to a first end of a cylindrical column 806, the second end of which is rotatably attached to a freestanding upright 808. A helical groove 810 is formed around the cylindrical body of column 806 and pockets 812 are formed at regular intervals along the groove. A drive cable 800 with nodules 814 affixed along its length is retained in groove 810 and engage with the groove and pockets. Hence, drive cable 800 is caused to be helically wound about column 816 in order to transduce the rotary motion of the steering wheel column to a linear displacement at its ends.

Rudder 804 is attached to a portion "B" of the boat wall by a hinge 816. A first end 818 of cable 800 is attached to a rudder 804 and the cable is then trained, in turn, around sheaves 820 and 822, around column 806, and then around sheaves 824 and 826 to be terminally attached at its second end 828 to the rudder. Thus, when wheel 802 is rotated, the rotary motion is transduced via drive cable 800 into a reciprocating or steering motion at rudder 804.

In this embodiment a different type of nodule is used to close the ends of the cable or the line means. Two preferred methods for attaching a nodule to an end of a cable are illustrated in cross-section in FIGS. 15b and 15c. In FIG. 15b an end of cable 800' is crimped or bent before a nodule 830 is formed thereon. In FIG. 15c the end of a cable 800' is frayed before a nodule 832 is formed thereon. By crimping or fraying the cable end before nodule attachment, the strength of the bond between the nodule and cable is much increased. Of course, for low cable stress applications, a nodule may simply be swaged or otherwise attached to a straight ended cable.

Although the present invention has been described with reference to particular preferred embodiments it is contemplated that many alterations and modifications will become apparent to those skilled in the art after having read this disclosure.

For instance, the grooves heretofor assumed to be formed around the curved surface of the sheaves may not be necessary and may be omitted for some applications. It is therefore intended that the appended claims be interpreted as covering all such alterations and modifications as fall within the true spirit and scope of this invention.

What is claimed is:

1. A positive drive system for rotatably coupling a drive means to a driven means, said drive system comprising:
    a drive sheave having a groove formed around its curved surface and a plurality of cylindrically-shaped pockets formed along said groove means, said pockets being separated from adjacent pockets by a distance defining the pitch of the sheave and having a depth beneath the bottom of said groove greater than one-half of the cylindrical diameter thereof;
    means for driving said first sheave;
    a first drive cable disposed to engage said sheave including;
        a single length of flexible 7×19 preformed and lubricated multistrand cable having its ends attached to each other to form a continuous, endless loop, said cable having an outside diameter less than the width of said groove;
        a plurality of nodules each consisting of a mass of material formed into a regular, geometric spherical solid having a diameter slightly less than the diameter of said pockets, said nodules being swagedly attached to said cable in regular, spaced apart disposition, the distance between adjacent nodules being substantially equal to the pitch of said sheaves, such that at any point in time a plurality of adjacent nodules engage a corresponding plurality of adjacent pockets on said sheave;
    means linking said drive cable to said driven means;
    whereby motion of said drive sheave is transferred to said driven means by said drive cable.

2. A positive drive system as recited in claim 1 wherein said sheave is further provided with vent holes consisting of bores formed between at least one surface of said sheave and a bottom portion of said pockets whereby said bores allow communication between said pockets and the ambient environment even during their engagement with a nodule.

3. A positive drive system as recited in claim 1 wherein said pockets comprise inwardly extending radial bores having a generally cylindrical outward portions and generally conical terminating portions and where the diameter of said cylindrical portion is less than the smallest diameter of said nodules whereby said nodules do not contact the bottom or sidewalls of said pockets.

4. A positive drive system as recited in claim 1 wherein said sheave comprises:
    a pulley having a V-belt groove;
    insert means having an inner surface which mates with said V-belt groove and having an outer surface with said groove means and said pockets formed thereon; and
    means securing said insert means within said V-belt groove.

5. A positive drive system as recite in claim 4 wherein said insert means is made from an elastomeric substance.

6. A positive drive system as recited in claim 1 wherein said sheave is further provided with generally radial slots formed through said pockets substantially perpendicular to said groove whereby said slots vent said pockets and provide a route for the expulsion of waste matter tending to collect in said pockets.

7. A positive drive system as recited in claim 6 wherein said sheave comprises
    an inner, annular core;
    an outer, annular ring having an inner diameter equal to the outer diameter of said core, the outer surface of said ring having formed thereon said groove means, pockets and slots;
    means for securing said ring around said core to produce a structurally unitary sheave body.

8. A positive drive system as recited in claim 7 wherein said ring is made from an elastomeric substance.

9. A positive drive system as recited in claim 1 wherein said sheave comprises
    a pair of facing, closely disposed sprocket wheels in substantial alignment so that the valleys between the teeth of said sprocket wheels form said pockets and the space between said sprocket wheels defines said groove means; and
    spacer means for separating said pair of sprocket wheels.

10. A positive drive system as recited in claim 1 wherein said plurality of nodules are rigidly attached to said line means.

11. A positive drive system as recited in claim 1 wherein said cable is constructed from nonorganic fibers.

12. A positive drive system as recited in claim 11 wherein said nonorganic fiber is composed of graphite.

13. A positive drive system as recited in claim 11 wherein said nonorganic fiber is composed of boron.

14. A positive drive system as recited in claim 12 wherein said nonorganic fiber is composed of glass.

15. A positive drive system as recited in claim 1 wherein said nodules are constructed from a metal alloy.

16. A positive drive system as recited in claim 15 wherein said metal alloy is stainless steel.

17. A positive drive system as recited in claim 1 wherein said nodules are of substantially equal size.

18. A positive drive system as recited in claim 1 wherein said means linking said drive cable to said driven means comprises rigid attachment means for rigidly attaching a portion of said drive cable to said driven means whereby said driven means may respond with a linear displacement to a rotary motion of said drive sheave.

* * * * *